United States Patent [19]

Pierson

[11] Patent Number: 4,979,315
[45] Date of Patent: Dec. 25, 1990

[54] FILTRATION APPARATUS WITH INTEGRAL DRYING BY ELECTROMAGNETIC RADIATION

[75] Inventor: Henri G. W. Pierson, Canary Islands, Spain

[73] Assignee: D & C Limited, Monrovia, Liberia

[21] Appl. No.: 388,637

[22] Filed: Aug. 2, 1989

[30] Foreign Application Priority Data

Aug. 23, 1988 [GB] United Kingdom ................. 8820005

[51] Int. Cl.$^5$ ............................................ F26B 19/00
[52] U.S. Cl. ............................................ 34/69; 34/60; 34/1; 34/17
[58] Field of Search ..................... 210/400, 770; 34/14, 34/17, 1, 68, 69, 18, 60

[56] References Cited

U.S. PATENT DOCUMENTS

| | | | |
|---|---|---|---|
| 3,731,036 | 5/1973 | Hallier et al. | 34/1 |
| 4,242,220 | 12/1980 | Sato | 34/1 X |
| 4,640,020 | 2/1987 | Wear et al. | 34/1 X |
| 4,657,682 | 4/1987 | Uyama et al. | 34/14 |

Primary Examiner—Henry A. Bennet
Attorney, Agent, or Firm—Dennison, Meserole, Pollack & Scheiner

[57] ABSTRACT

Subsequent to formation of a filter cake upon the surface of belt and further vacuum filtration (via vacuum trays), the cake passed below and is covered by an impervious sheet, and is dried by application of radiation, e.g. microwaves, radio waves, through the sheet, along with further evacuation (via vacuum trays) below the sheet. Because the cake is under suction pressure, the evaporation temperature of the filtrate is lowered to a level which will not adversely affect the cake, and which can be reached very rapidly by application of this form of radiation.

9 Claims, 2 Drawing Sheets

FILTRATION APPARATUS WITH INTEGRAL DRYING BY ELECTROMAGNETIC RADIATION

BACKGROUND ART

In many industrial filtration processes, a filter cake is formed upon a filter cloth by supplying a suspension or slurry to one side of the cloth and applying a negative pressure at the other side of the cloth to remove liquid from the suspension or slurry. Such process is known as "dewatering", although other liquid constituents and dissolved substances may also be removed. Also, the term "filter cloth" as used herein is intended to cover any suitable or commercially available web material for filtering purposes, not just textile fabric.

Many types of apparatus are known for accomplishing the aforesaid filtration process, for example rotary drum filters, rotary disc filters, horizontal belt filters and many others.

Since vacuum induced dewatering cannot achieve total removal of moisture from the filter cake it is often necessary to follow the filtration step with a thermal drying step. Ideally this should be done in the same equipment to avoid the need for mans Opp O OO Oy0::B' heat sensitive such that drying temperatures may never exceed 80° or 90° C., not even during a break down. At such temperatures the overall drying time is too long in comparison with the filtration time, making the equipment impossibly large. In this respect typical filtration times in continuously operating equipment are of the order of two to three minutes, whereas drying times at such temperatures are often of the order of twenty to thirty minutes.

A further difficulty in drying the filtered product "in situ" is that upon drying the filter cake has a tendency to form a hard crust which inhibits the drying process and may make the product difficult to remove at the end.

OBJECT OF THE INVENTION

It is an object of the present invention to provide means whereby extremely short drying times can be accomplished in continuously operating vacuum filters, without any danger of exceeding critical temperature limits.

SUMMARY OF THE INVENTION

Pursuant hereto the invention provides filtration apparatus comprising a filter cloth onto which a suspension or slurry to be filtered is to be applied, means for progressing the filter belt, vacuum means operative, by suction through the filter cloth, firstly to remove liquid from the suspension or slurry, so that a filter cake is formed thereon, and subsequently to apply suction pressure to the filter cake, an impervious sheet disposed over the filter cake, and means for directing electromagnetic radiation, preferably microwaves or radio waves, at the filter cake, when covered by said sheet, so as to evaporate moisture and dry the cake.

Any electromagnetic wave frequency which will excite liquid molecules and cause evaporation at a sufficiently high rate can potentially be used. In practice, both microwave and radio frequency radiation have performed well.

The invention also provides a corresponding method comprising feeding a suspension or slurry to be filtered onto one side of a filter cloth, applying vacuum pressure from the other side of the cloth so as to dewater the slurry or suspension and form a filter cake thereon, and subsequently applying said vacuum pressure to said cake whilst covering the filter cake with an impervious sheet, thereby putting the filter cake under partial vacuum, and directing electromagnetic radiation of suitable frequency at the filter cake, whilst covered by said sheet.

It will be appreciated that the radiation penetrates the impervious sheet and heats up the remaining liquid in the filter cake. However, as the latter is under partial vacuum by virtue of continued vacuum pressure through the filter cloth while it is covered by said sheet, the liquid evaporates well below its normal boiling point. Ideally in the case of water, using normal industrial vacuum pressures, evaporation can be made to occur at a temperature in the region of 70° C., compared to 100° C. at atmospheric pressure. Obviously, while evaporation is taking place there is no possibility that the temperature of the filter cake can rise above the aforesaid level, so drying takes place well below any critical temperature at which the cloth or the product might be damaged. Moreover after evaporation is complete the radiation has no effect on the dry matter so no excess heating can occur. A further advantage is that as a result of the continued application of vacuum pressure the impervious sheet is, at the outset, pulled tightly onto the filter cake, effectively vacuum wrapping it, so no hard crust or fissures are able to form. This facilitates even heating/drying and subsequent removal of dried product from the filter cloth.

In the case of filtration apparatus incorporating filter cloths in the form of endless belts, e.g. horizontal belt or rotary drum filters, the belt is conventionally successively progressed through a feed zone, where slurry to be filtered is supplied, and a filtration zone where vacuum is applied for dewatering. In accordance with the invention it is envisaged that prior to discharge of the filtered product the filter belt carrying the filter cake will pass into and progress through an oven, at the entrance of which the impervious sheet will be applied thereover. Vacuum means, for example, vacuum trays will still be provided, positioned below the belt, inside the oven, and the oven will incorporate a source of suitable electromagnetic radiation, i.e. microwaves, radio frequency waves, or other radiation.

BRIEF DESCRIPTION OF DRAWINGS

The invention will be described further, by way of example only, with reference to the accompanying schematic drawings of a horizontal vacuum belt filter. It will be appreciated however, that the invention could equally well be applied to other types of vacuum filter equipment, such as a rotary drum filter or a rotary disc filter.

DETAILED DESCRIPTION OF ILLUSTRATED EMBODIMENT

Figure 1:
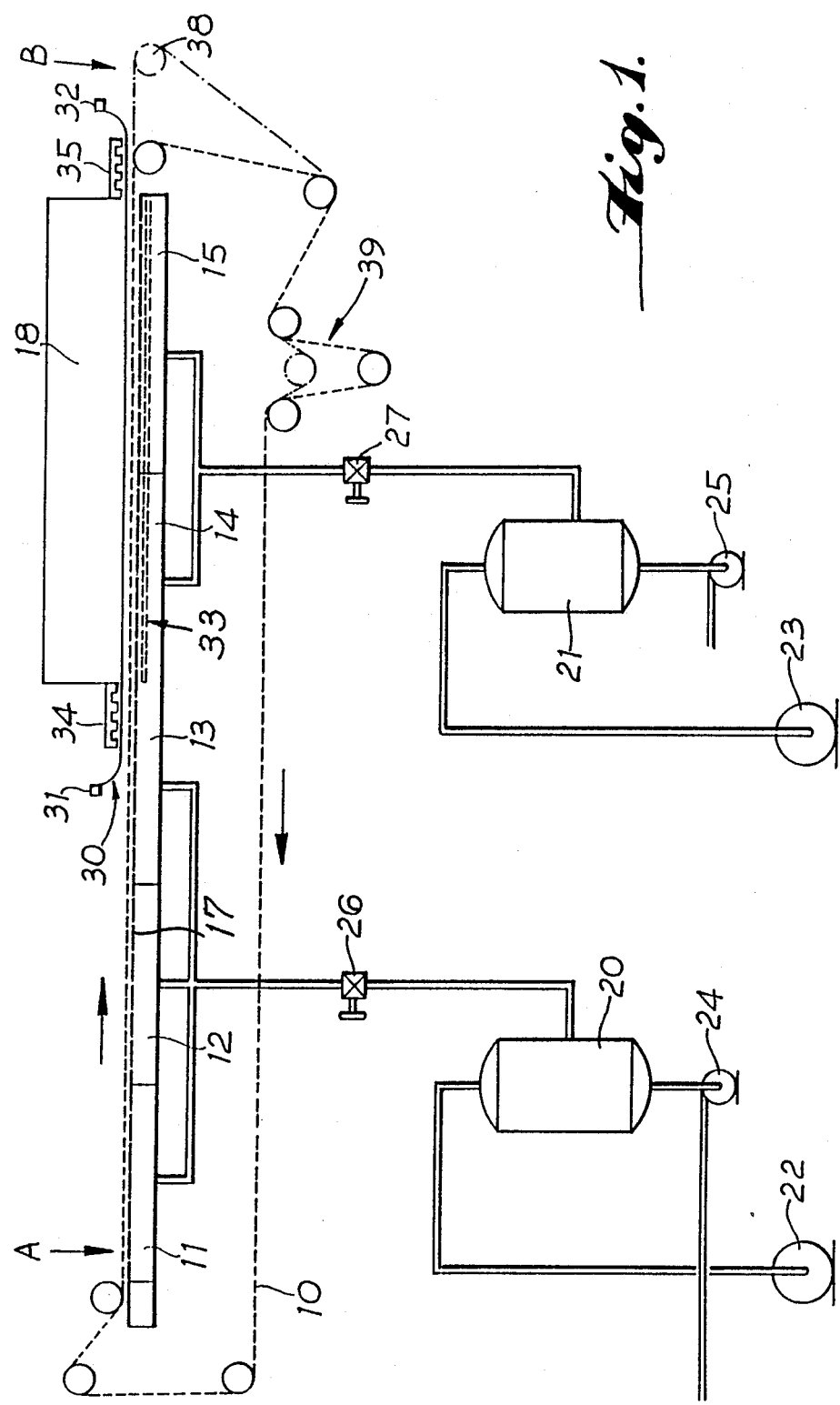

In a horizontal vacuum belt filter, as illustrated, an endless filter belt 10 is conducted around guide rolls to include an upper run which extends from an upstream feed zone A at the left to a downstream discharge zone B at the right. In between these it extends above a series of vacuum boxes or trays 11 to 15, and is supported upon a grid 17 which overlies the trays. Towards the discharge end B, the belt 10 additionally extends through a microwave oven 18, which in this example is disposed above the last two vacuum trays 14, 15. Thus the first three trays 11 to 13 are for filtration and are connected by pipelines and via valve 26 to a first reservoir 20 for reception of filtrate, while the latter two trays 14, 15 are for drying and are connected by pipelines and via valve 27 to a second reservoir 21 serving as a 'catch pot' for condensate.

A sheet 30 of impervious material, such as polypropylene, is mounted above the belt 10 and extends through the oven 18. The front and rear edges of the sheet 30 are affixed, e.g. by tacking or adhesive, to respective shafts 31, 32 which extend transversely of the belt 10 upstream and downstream of the oven 18.

Below the belt 10 in the region of the oven 18 is a reflector plate 32, which naturally will be perforated. This is shown below the grid 17 covering the vacuum trays 14 and 15. However, it could alternately be between the belt 10 and the grid 17, or form an integral part of the belt fabric, or be located at the bottom of the vacuum trays, the distance between the microwave emitter and the plate 32 being chosen as optimal dependant on the likely thickness of filter cake being dried.

Finally, protective screens 34, 35 project from the oven inlet and outlet to shield operatives from microwaves.

Use of the apparatus will readily be appreciated. The belt 10 is intermittently progressed in the direction indicated by the arrows by alternate forward and backward movement of the downstream guide roll 38, e.g. by means of a pneumatic ram (not shown), and a one-way mechanism (not shown) in the lower run of the belt. A tensioning mechanism, comprising a dancing roll in a bight of the belt, generally indicated at 39, is provided in the lower run of the belt 10. Vacuum is applied, via trays 11 to 15, only when the belt is stationary by automatic switching of valves 26, 27. When the belt is moving these are switched to vent the trays. Suspension or slurry to be filtered is supplied to the upper surface in the feed zone A. This is dewatered (a general term intended to cover removal of any mother liquor, not just pure water) by suction, in conventional manner, as the belt 10 passes across the first vacuum tray 11 with the result that a relatively moist filter cake remains on the belt surface. Further dewatering occurs as the belt crosses the next two trays 12 and 13, and the filtrate drains to reservoir 20.

Before the belt 10 passes below the screen 34 and enters the oven 18, the filter cake C passes beneath and is covered by the impervious sheet 30. When vacuum is applied to the underlying trays 14, 15, the sheet 30 is drawn tightly onto the filter cake which is, consequently, held under a partial vacuum. In the oven 18, microwaves from a suitable source are directed at the filter cake and, in combination with the rays reflected from the underlying plate 32, these evaporate all residual moisture from the cake extremely rapidly, for example, in as little as two minutes, whilst heating same to a temperature of about 70° C. The moisture is, of course, able to evaporate via the belt and passes to reservoir 21.

When the vacuum is released, i.e. when the belt is progressed, the sheet 30 is no longer so tightly held and simply 'rides' over the surface of the cake, before being sucked back into contact therewith in the next stationary evacuation phase. Although the main purpose of the sheet is to induce the partial pressure and lower the evaporation temperation of the filtrate, an additional advantage is that it reduces the tendancy of crust or crack formation on/in the cake, which would otherwise hinder drying of said cake.

The belt eventually leaves the oven 18 with the filter cake fully dried and the latter is then removed in the usual way, by dropping from the downstream end of the upper run at B.

As the drying time is of similar length to the time required for the preceding filtration to be effected the apparatus can be satisfactorily operated in continuous manner without having to be excessively large to accommodate a drying phase. It therefore becomes possible to combine filtration and drying operations in the same equipment with the attendent economic advantages.

The foregoing is, of course, only one specific example of application of the invention to an intermittent vacuum filter of horizontal type.

In other embodiments other suitable radiation may be employed for drying. For example, radio frequency emissions have been found to be a practical alternative to microwaves. Other parts of the electromagnetic spectrum may also be used provided they excite the filtrate molecules sufficiently to bring about rapid evaporation and present no great hazard to operators.

Figure 2:
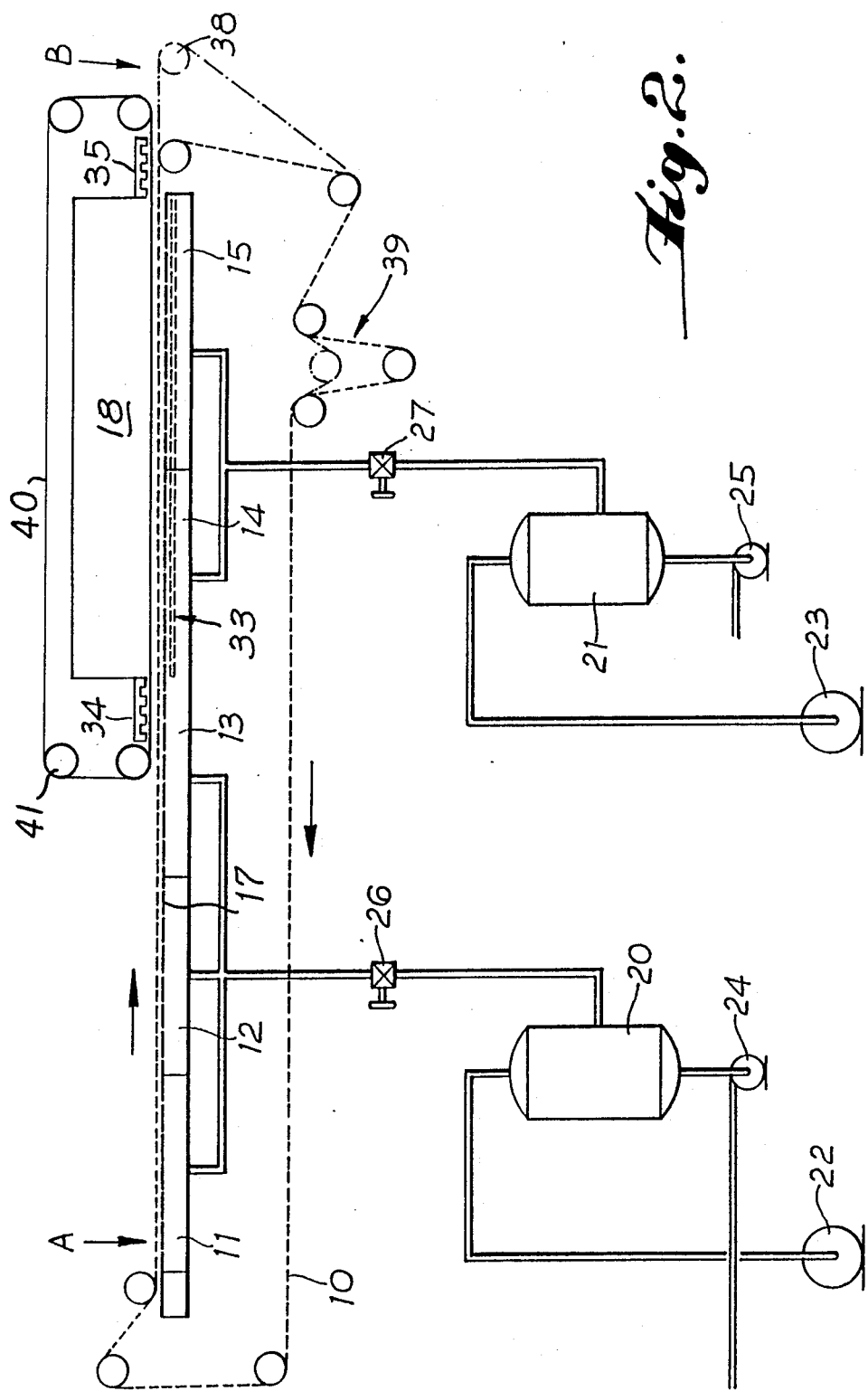

Also, the invention can be applied to a horizontal filter belt, where the vacuum operates continously, in which case the impervious sheet would have to move with the belt (since it is permanently sucked into contact with the cake on the belt) so an endless sheet running over an arrangement of pulleys would be needed along with appropriate sheet guiding and tensioning means. Such an arrangement is shown in FIG. 2 where a continuous impervious belt 40 is carried on rollers 41. A similar arrangement could be provided to allow the same principles to be applied to continuously evacuated rotary filter apparatus.

I claim:

1. Filtration apparatus comprising:
   a filter material on which a slurry or suspension to be filtered may be deposited on a first side thereof;
   means for progressing said filter material from an upstream to a downstream portion of said apparatus;
   means for applying a vacuum to a side of said filter material opposite said first side, thereby applying suction through said filter material;
   a flexible and impervious sheet disposed adjacent the first side of at least a portion of said filter material such that application of a vacuum causes said flexible and impervious sheet to be drawn against said filter material and any slurry or suspension deposited thereon; and
   means for directing electromagnetic radiation toward the portion of the first side of said filter material at which said flexible and impervious sheet is disposed.

2. Apparatus as set forth in claim 1 wherein the electromagnetic radiation used is radio frequency radiation.

3. Apparatus as set forth in claim 1 wherein the means for directing electromagnetic radiation at the filter cake comprises part of a microwave oven through which the filter material is passed.

4. Apparatus as set forth in claim 1 wherein a radiation reflector is arranged below the filter material, opposite to the means for directing electromagnetic radiation.

5. Apparatus as set forth in claim 1 wherein means are provided for progressing the belt only intermittently, and means are provided for operating the vacuum means only during stationary phases of the material, and wherein said impervious sheet is stretched above said material between respective fixed shafts.

6. Apparatus according to claim 1, wherein said means for applying a vacuum comprises a first vacuum means disposed adjacent the upstream portion of said apparatus, and a second vacuum means disposed adjacent the downstream portion of said apparatus, and wherein said flexible and impervious sheet is disposed adjacent the downstream portion of said apparatus.

7. Apparatus according to claim 1, wherein said filter material is in the form of a continuous belt.

8. Apparatus according to claim 1, wherein said sheet is in the form of a continuous belt.

9. Apparatus according to claim 1, wherein said means for applying a vacuum includes reservoir means.

* * * * *